United States Patent
Tang

(10) Patent No.: US 11,316,651 B2
(45) Date of Patent: Apr. 26, 2022

(54) CONTROL METHOD FOR DUPLICATE DATA TRANSMISSION FUNCTION, TERMINAL, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/650,813

(22) PCT Filed: Sep. 27, 2017

(86) PCT No.: PCT/CN2017/103675
§ 371 (c)(1),
(2) Date: Mar. 25, 2020

(87) PCT Pub. No.: WO2019/061075
PCT Pub. Date: Apr. 4, 2019

(65) Prior Publication Data
US 2020/0235897 A1 Jul. 23, 2020

(51) Int. Cl.
*H04L 5/00* (2006.01)
*H04L 1/16* (2006.01)
(Continued)

(52) U.S. Cl.
CPC .......... *H04L 5/0098* (2013.01); *H04L 1/1614* (2013.01); *H04L 5/0032* (2013.01);
(Continued)

(58) Field of Classification Search
None
See application file for complete search history.

(56) References Cited

U.S. PATENT DOCUMENTS

2009/0016301 A1  1/2009  Sammour
2015/0092707 A1  4/2015  Kwon
(Continued)

FOREIGN PATENT DOCUMENTS

CN  101087475 A  12/2007
CN  105917716 A   8/2016
(Continued)

OTHER PUBLICATIONS

Huawei, HiSilicon; "Remaining stage 2 issues for CA duplication and for DC duplication", 3GPP TSG-RAN WG2 Meeting #99, R2-1708691, Berlin, Germany, Aug. 21-25, 2017.
(Continued)

*Primary Examiner* — Otis L Thompson, Jr.
(74) *Attorney, Agent, or Firm* — Perkins Coie LLP

(57) ABSTRACT

Disclosed in an embodiment of the present invention are a control method for a duplicated data transmission function, a terminal and a computer storage medium, the method comprising a terminal determining a bit in a received bit map according to configured indication information corresponding to a data radio bearer (DRB) and/or a preset rule, the bit map being one from among two received bit maps, the terminal determining a duplicate data transmission function of the DRB to be activated/deactivated on the basis of the indication of the bit.

20 Claims, 3 Drawing Sheets

(51) Int. Cl.
    H04W 80/02      (2009.01)
    H04W 80/08      (2009.01)
    H04W 84/20      (2009.01)
(52) U.S. Cl.
    CPC ........... *H04W 80/02* (2013.01); *H04W 80/08*
                    (2013.01); *H04W 84/20* (2013.01)

(56) References Cited

U.S. PATENT DOCUMENTS

| | | |
|---|---|---|
| 2016/0338139 A1 | 11/2016 | Kwon |
| 2017/0041767 A1 | 2/2017 | Vajapeyam et al. |
| 2017/0208501 A1 | 7/2017 | Lee et al. |
| 2018/0279262 A1* | 9/2018 | Babaei .................. H04W 72/04 |
| 2018/0302945 A1 | 10/2018 | Jungkil |
| 2018/0332501 A1* | 11/2018 | Tseng ...................... H04L 1/189 |
| 2018/0367288 A1* | 12/2018 | Vrzic ................ H04W 36/0069 |
| 2018/0368107 A1* | 12/2018 | Babaei ................ H04L 27/2608 |
| 2018/0368132 A1* | 12/2018 | Babaei .................. H04W 80/02 |
| 2018/0368200 A1* | 12/2018 | Jin .......................... H04W 76/15 |
| 2019/0239279 A1* | 8/2019 | Shi .......................... H04W 80/08 |
| 2019/0394693 A1* | 12/2019 | Kim ...................... H04W 36/06 |
| 2020/0205050 A1* | 6/2020 | Shah ...................... H04W 36/22 |
| 2020/0367305 A1* | 11/2020 | Jin .......................... H04L 1/1867 |

FOREIGN PATENT DOCUMENTS

| | | | |
|---|---|---|---|
| WO | 2009009532 A2 | 1/2009 | |
| WO | 2014161168 A1 | 10/2014 | |
| WO | 2017023444 A1 | 2/2017 | |
| WO | WO-2020109651 A * | 6/2020 | ............ H04W 76/15 |

OTHER PUBLICATIONS

Written Opinion of the International Search Authority in the international application No. PCT/CN2017/103675, dated Jun. 15, 2018.
International Search Report in the international application No. PCT/CN2017/103675, dated Jun. 15, 2018.
Supplementary International Search Report in the international application No. PCT/CN2017/103675, dated Sep. 18, 2019.
Catt. Duplication Activation/Deactivation MAC CE. 3GPP TSG-RAN WG2#99 R2-1707921. Aug. 25, 2017 (Aug. 25, 2017), section1, section 2.
Huawei et al. Design of MAC CE for duplication activation/deactivation. 3GPP TSG RAN WG2#99 R2-1707712. Aug. 25, 2017(Aug. 25, 2017), entire document.
LG Electronics Inc. PDCP duplication impacts for MAC. 3GPP TSG-RAN2 Meeting #101 R2-1802298. Mar. 2, 2017(Mar. 2, 2017), entire document.
Oppo: "Details of the duplication control MAC CE", 3GPP Draft; R2-1707741—Details of the Duplication Control MAC CE, 3rd Generation Partnership Project(3GPP), Mobile Competence Centre; 650, Route Des Lucioles; F-06921 Sophia-Antipolis Cedex; France, vol. RAN WG2, No. Berlin, German; Aug. 21, 2017-Aug. 25, 2017 Aug. 20, 2017(Aug. 20, 2017), XP051317702.
Mediatek Inc: "MAC CE design for duplication", 3GPP Draft; R2-1708102 MAC CE Design for Duplication, 3rd Generation Partnership Project(3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017 Aug. 20, 2017(Aug. 20, 2017), XP051318006.
Nokia et al.: "MAC details on Duplication Activation/Deactivation", 3GPP Draft; R2-1708769 MAC Details on Duplication Activation Deactivation, 3rd Generation Partnership Project(3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017 Aug. 20, 2017(Aug. 20, 2017), XP051318574.
Asustek: "The format of Activation MAC Control Element for Dual Connectivity", 3GPP Draft; R2-141466 The Format of Activation MAC Control Element for Dual Connectivity_V1, 3rd Generation Partnership Project(3GPP), Mobile Competence Centre; 650, Route Des Lucioles; F-06921 SOP, vol. RAN WG2, No. Valencia, Spain; Mar. 31, 2014-Apr. 4, 2014 Mar. 21, 2014(Mar. 21, 2014), XP050817531.
Oppo: "The impact of duplication on MAC", 3GPP Draft; R2-1706344—The Impact of Duplication on MAC, 3rd Generation Partnership Project(3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017 Jun. 16, 2017(Jun. 16, 2017), XP051306403.
First Office Action of the Japanese application No. 2020-517490, dated Jun. 8, 2021.
First Office Action of the Chinese application No. 202010383968.2, dated Jun. 1, 2021.
Huawei, HiSilicon,"Configuration and control of packet duplication" 3GPP TSG RAN WG2 NR Ad Hoc,R2-1706716. Jun. 27-29, 2017.
First Office Action of the European application No. 17927668.8, dated Jul. 26, 2021. 5 pages.
Office Action of the Indian application No. 202017017780, dated Aug. 19, 2021. 6 pages with English translation.
First Written Opinion of the Singaporean application No. 11202002778S, dated Dec. 3, 2021. 10 pages.
Ericsson, Aligned duplication support for DRBs and SRBs, 3GPP TSG RAN WG2#99 R2-1708017, 3GPP, Aug. 11, 2017. 6 pages.
Second Office Action of the Japanese application No. 2020-517490, dated Jan. 14, 2022. 6 pages with English translation.
First Office Action of the Canadian application No. 3077130, dated May 3, 2021. Received Oct. 29, 2021. 11 pages.
3rd Generation Partnership Project; Technical Specification Group Radio Access Network; NR; Medium Access Control (MAC) protocol specification (Release 15), 3GPP Draft; 38321-100, Sep. 10, 2017 (Sep. 10, 2017), XP051324033. 46 pages.
Second Office Action of the European application No. 17927668.8, dated Jan. 24, 2022. 5 pages.

* cited by examiner

ND COMPUTER STORAGE
MEDIUM

CONTROL METHOD FOR DUPLICATE DATA TRANSMISSION FUNCTION, TERMINAL, AND COMPUTER STORAGE MEDIUM

CROSS-REFERENCE TO RELATED APPLICATIONS

The present application is a U.S. National Phase Entry of International PCT Application No. PCT/CN2017/103675 filed on Sep. 27, 2017, entitled "CONTROL METHOD FOR DUPLICATE DATA TRANSMISSION FUNCTION, TERMINAL, AND COMPUTER STORAGE MEDIUM", the content of which is hereby incorporated by reference in its entirety.

TECHNICAL FIELD

The disclosure relates to wireless communication technology, and particularly to a method for controlling duplicated data transmission function, a terminal and a computer storage medium.

BACKGROUND

Under a dual connection architecture, a protocol architecture for a split data radio bearer (DRB) is used for duplicated data transmission, a master cell group (MCG) and a secondary cell group (SCG) respectively send two identical pieces of data to a terminal, and the terminal discards one piece of data of the two identical pieces of data and transmits the other piece of data to a higher layer.

Duplicated data transmission function is activated or deactivated under an indication of a bitmap. In the 5G system, under the dual connection architecture, the MCG and the SCG may send media access control (MAC) control elements (CEs) including bitmaps to a terminal respectively. At present, there is no effective solution in the related art about how the terminal selects the bitmap corresponding to the MCG or the SCG and determines correspondences between a bit in the bitmap and the split DRB having the duplicated data transmission function so as to control activation/de-activation of the duplicated data transmission function of the split DRB.

SUMMARY

In order to solve the existing technical problem, a method for controlling duplicated data transmission function, a terminal and a computer storage medium are provided according to the embodiments of the disclosure.

A method for controlling duplicated data transmission function is provided according to an embodiment of the disclosure, which includes the following operations.

A terminal determines a bit in a received bitmap based on indication information configured correspondingly to a DRB and/or a preset rule. The bitmap is of two received bitmaps.

The terminal determines to activate/deactivate duplicated data transmission function of the DRB based on the bit.

In an embodiment, the DRB may be a split DRB which is configured with the duplicated data transmission function.

In an embodiment, the indication information may include an indication identifier and an indication bit.

The operation that the terminal determines the bit in the received bitmap based on the indication information configured correspondingly to the DRB may include the following operations.

The terminal selects the received bitmap corresponding to an MCG or an SCG for the DRB based on the indication identifier.

The terminal determines the bit in the bitmap based on the indication bit.

In an embodiment, the indication information may include the indication identifier.

The operation that the terminal determines the bit in the received bitmap based on the indication information configured correspondingly to the DRB and the preset rule may include the following operations.

The terminal determines the received bitmap corresponding to the MCG or the SCG for the DRB based on the indication identifier.

The terminal determines the bit in the bitmap based on an identifier of the DRB.

In an embodiment, the DRB may be a non-split DRB which is configured with the duplicated data transmission function.

In an embodiment, the indication information may include the indication bit.

The operation that the terminal determines the bit in the received bitmap based on the indication information configured correspondingly to the DRB may include the following operations.

The terminal selects the received bitmap corresponding to the MCG or the SCG for the DRB.

The terminal determines the bit in the bitmap based on the indication bit.

In an embodiment, the operation that the terminal determines the bit in the received bitmap based on the preset rule may include the following operations.

The terminal determines the received bitmap corresponding to the MCG or the SCG for the DRB.

The terminal determines the bit in the bitmap based on an identifier of the DRB.

In an embodiment, pieces of indication information configured correspondingly to non-split DRBs of different cell groups have identical or different indication bits.

In an embodiment, the operation that the terminal determines the bit in the bitmap based on the identifier of the DRB may include the following operations.

The terminal performs sequencing on the identifier of the DRB and one or more identifiers of other DRBs and determines the bit in the bitmap based on a position of the identifier of the DRB in the sequencing.

Herein, the sequencing may include sequencing in ascending order or sequencing in descending order.

In an embodiment, before the operation that the terminal determines the bit in the received bitmap based on the indication information configured correspondingly to the DRB and/or the preset rule, the method may further include the following operation.

The terminal receives a bitmap corresponding to a MAC entity of the MCG and a bitmap corresponding to a MAC entity of the SCG respectively.

In an embodiment, the operation that the terminal receives the bitmap corresponding to the MAC entity of the MCG and the bitmap corresponding to the MAC entity of the SCG respectively may include the following operations.

A first MAC entity of the terminal receives a first media access control (MAC) control element (CE) corresponding to the MAC entity of the MCG, and obtains a bitmap in the first MAC CE.

A second MAC entity of the terminal receives a second MAC CE corresponding to the MAC entity of the SCG, and obtains a bitmap in the second MAC CE.

In an embodiment, the operation that the terminal determines to activate/deactivate of the duplicated data transmission function of the DRB based on the bit may include the following operation.

A Packet Data Convergence Protocol (PDCP) entity of the terminal determines to activate/deactivate the duplicated data transmission function of the DRB based on a value of the bit. The PDCP entity corresponds to the DRB.

A terminal is further provided according to an embodiment of the disclosure, which may include a first determining unit and a second determining unit.

The first determining unit is configured to determine a bit in a received bitmap based on indication information configured correspondingly to DRB and/or a preset rule, wherein the bitmap is of two received bitmaps.

The second determining unit is configured to determine to activate/deactivate duplicated data transmission function of the DRB based on the bit determined by the first determining unit.

In an embodiment, the DRB may be a split DRB which is configured with the duplicated data transmission function.

In an embodiment, the indication information may include an indication identifier and an indication bit.

The first determining unit may be configured to select the received bitmap corresponding to an MCG or an SCG for the DRB based on the indication identifier, and determine the bit in the bitmap based on the indication bit.

In an embodiment, the indication information may include the indication identifier.

The first determining unit may be configured to determine the received bitmap corresponding to an MCG or an SCG for the DRB based on the indication identifier, and determine the bit in the bitmap based on an identifier of the DRB.

In an embodiment, the DRB may be a non-split DRB which is configured with the duplicated data transmission function.

In an embodiment, the indication information may include the indication bit.

The first determining unit may be configured to select the received bitmap corresponding to the MCG or the SCG for the DRB and determine the bit in the bitmap based on the indication bit.

In an embodiment, the first determining unit may be configured to determine the received bitmap corresponding to the MCG or the SCG for the DRB and determine the bit in the bitmap based on the identifier of the DRB.

In an embodiment, pieces of indication information configured correspondingly to non-split DRBs of different cell groups have identical or different indication bits.

In an embodiment, the first determining unit may be configured to perform sequencing on the identifier of the DRB and one or more identifiers of other DRBs, and determine the bit in the bitmap based on a position of the identifier of the DRB in the sequencing. The sequencing includes sequencing in ascending order or sequencing in descending order.

In an embodiment, the terminal may further include a receiving unit, configured to, before the first determining unit determines the bit in the received bitmap based on the indication information configured correspondingly to the DRB and/or the preset rule, receive a bitmap corresponding to an MAC entity of an MCG and a bitmap corresponding to an MAC entity of an SCG.

In an embodiment, the receiving unit may include a first receiving subunit and a second receiving subunit.

The first receiving subunit may be configured to receive, through a first MAC entity, a first MAC CE corresponding to the MAC entity of the MCG, and obtain the bitmap in the first MAC CE.

The second receiving subunit may be configured to receive, through a second MAC entity, a second MAC CE corresponding to the MAC entity of the SCG, and obtain the bitmap in the second MAC CE.

In an embodiment, the second determining unit may be configured to determine, through a PDCP entity, to activate/deactivate the duplicated data transmission function of the DRB based on a value of the bit. The PDCP entity corresponds to the DRB.

A computer storage medium is further provided according to the embodiments of the disclosure, in which a computer instruction may be stored. The instruction implements the steps in the method for controlling duplicated data transmission function according to the embodiment of the disclosure when being executed by a processor.

A terminal is further provided according to the embodiments of the disclosure, which includes a communication component configured for data transmission, a memory, a processor and a computer program stored in the memory and capable of being run in the processor. The processor implements the steps in the method for controlling the duplicated data transmission function according to the embodiments of the disclosure when executing the program.

With the method for controlling the duplicated data transmission function, the terminal and the computer storage medium provided in the embodiments of the disclosure, the terminal determines the bit in the received bitmap based on the indication information configured correspondingly to the DRB and/or the preset rule, the bitmap is of the two received bitmaps, and the terminal determines to activate/deactivate the duplicated data transmission function of the DRB based on the bit. With the technical solutions of the embodiments of the disclosure, the bit in the bitmap is determined based on the indication information configured correspondingly to the DRB and/or the preset rule, and the bitmap corresponding to the MCG or the SCG may be determined based on the indication information in a dual connection scenario. Therefore, the duplicated data transmission function of the DRB may be activated/deactivated based on indication about the bit in the bitmap.

DETAILED DESCRIPTION

Figure 1A:
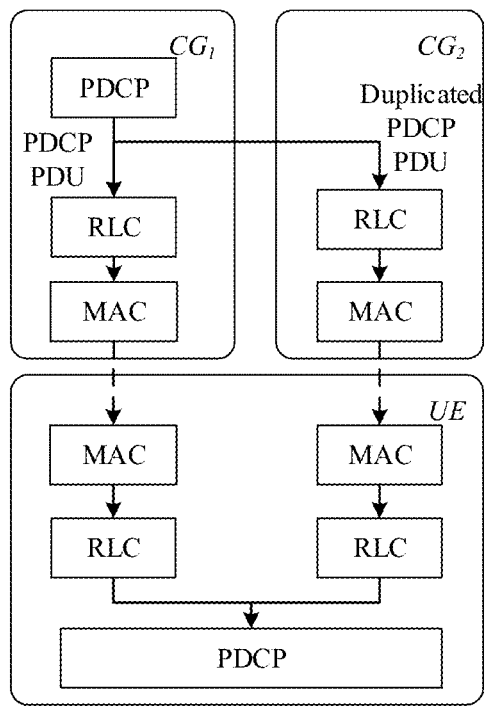
FIG. 1a is a schematic diagram showing a downlink protocol stack architecture of a dual connection system.
Figure 1B:
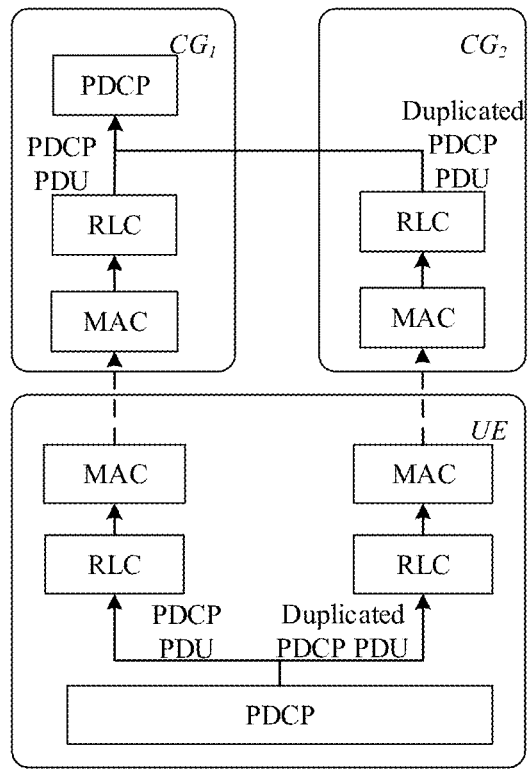
FIG. 1b is a schematic diagram showing an uplink protocol stack architecture of a dual connection system.

Before a method for controlling duplicated data transmission function according to the embodiments of the disclosure is described in detail, a protocol stack architecture in a dual connection architecture is described. FIG. 1a is a schematic diagram showing a downlink protocol stack architecture in a dual connection system. FIG. 1b is a schematic diagram showing an uplink protocol stack architecture in the dual connection system. As shown in FIG. 1a, for the downlink protocol stack architecture, a packet data convergence protocol (PDCP) entity is arranged in a cell group (CG), and the CG is called an anchor CG. A PDCP Protocol Data Unit (PDU) is duplicated by the PDCP entity to obtain two identical PDUs, for example, one is the PDCP PDU and the other is a duplicated PDCP PDU. The PDCP PDU and the duplicated PDCP PDU are transferred through Radio Link Control (RLC) and MAC of different CGs (for example, an MCG and an SCG), respectively, and are sent to MAC entities and RLC entities of a terminal corresponding to the different CGs through air interfaces, and are converged in the PDCP entity of the terminal. Upon monitoring that the two PDCP PDUs are two identical PDUs, one of which is obtained by duplicating the other, the PDCP entity discards one of the two PDCP PDUs and transmits the other to a high-layer entity. On the contrary, as shown in FIG. 1b, a PDCP PDU is duplicated by the PDCP entity of the terminal to obtain two identical PDUs, for example, one is the PDCP PDU and the other is a duplicated PDCP PDU. The PDCP PDU and the duplicated PDCP PDU are transferred through RLC and MAC corresponding to different CGs (for example, the MCG and the SCG), respectively, and are sent to the MAC entity and the RLC entity of the MCG and the MAC entity and the RLC entity of the SCG through the air interfaces respectively, and are converged in the PDCP entity serving as the anchor CG.

As shown in FIG. 1a and FIG. 1b, the PDCP entity, as a bearer, which is connected to two RLC and two MAC, is called a split bearer If the PDCP entity is arranged in the MCG, the bearer may be called an MCG split bearer. If the PDCP entity is arranged in the SCG, the bearer may be called an SCG split bearer.

In the 5G system, regarding a bearer which is configured with duplicated data transmission function, the duplicated data transmission function of the bearer may be dynamically activated or deactivated through a MAC CE. In a dual connection scenario, duplicated data transmission function of a split bearer of a terminal can be activated or deactivated in response to MAC CEs respectively transmitted by the MCG and the SCG. Herein, the MAC CE may include a bitmap, that is, different bits correspond to different bearers. A value of a bit represents activation or de-activation of the duplicated data transmission function of the bearer corresponding to the bit. However, in the dual connection scenario, the terminal may not determine a correspondence between the bitmap of the MCG or the SCG and the bearer. On such a basis, the following embodiments of the disclosure are proposed.

The disclosure is further described in detail below in conjunction with the drawings and specific embodiments.

First Embodiment

Figure 2:
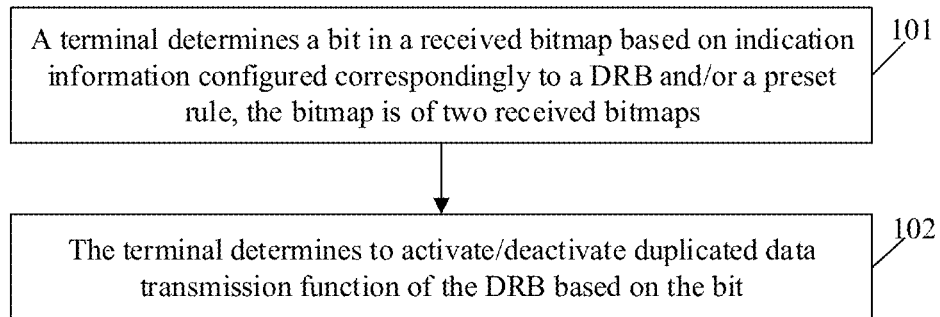
FIG. 2 is a flowchart of a method for controlling duplicated data transmission function according to an embodiment of the disclosure.

A method for duplicated data transmission function is provided according to an embodiment of the disclosure. FIG. 2 is a flowchart of a method for controlling duplicated data transmission function according to an embodiment of the disclosure. As shown in FIG. 2, the method includes steps 101 to 102.

In 101, a terminal determines a bit in a received bitmap based on indication information configured correspondingly to a DRB and/or a preset rule. The bitmap is of two received bitmaps.

In 102, the terminal determines to activate/deactivate duplicated data transmission function of the DRB based on the bit.

In the embodiment of the disclosure, before the operation that the terminal determines the bit in the received bitmap based on the indication information configured correspondingly to the DRB and/or the preset rule, the method further includes: the terminal receives a bitmap corresponding to a MAC entity of an MCG and a bitmap corresponding to a MAC entity of an SCG.

Herein, the operation that the terminal receives the bitmap corresponding to the MAC entity of the MCG and the bitmap corresponding to the MAC entity of the SCG includes that: a first MAC entity of the terminal receives a first MAC control element (CE) corresponding to the MAC entity of the MCG and obtains a bitmap in the first MAC CE; and a second MAC entity of the terminal receives a second MAC CE corresponding to the MAC entity of the SCG and obtains a bitmap in the second MAC CE.

Correspondingly, the operation that the terminal determines to activate/deactivate the duplicated data transmission function of the DRB based on the bit includes: a PDCP entity of the terminal determines to activate/deactivate the duplicated data transmission function of the DRB based on a value of the bit. The PDCP entity corresponds to the DRB. It can be understood that, a DRB which is configured with the duplicated data transmission function determines a bit in a bitmap in the MAC CE received by the MAC entity, informs a PDCP entity corresponding to the DRB of a value of the bit, and the PDCP entity determines to activate/deactivate the duplicated data transmission function based on the value of the bit.

In the embodiment, before the operation that the terminal determines the bit in the received bitmap based on the indication information configured correspondingly to the DRB and/or the preset rule, the method further includes: the terminal obtains signaling sent by a network device and determines the indication information corresponding to the DRB and/or the preset rule based on the signaling. Herein, the signaling may be Radio Resource Control (RRC) signaling. That is, the terminal may obtain the indication information and/or the preset rule based on a semi-static configuration of the network device.

The embodiment of the disclosure may be applied to two scenarios. In a first application scenario, the DRB is a split DRB which is configured with the duplicated data transmission function. In a second application scenario, the DRB is a non-split DRB which is configured with the duplicated data transmission function.

In the first application scenario, as a first implementation, the indication information includes an indication identifier and an indication bit. The operation that the terminal determines the bit in the received bitmap based on the indication information configured correspondingly to the DRB includes an operation as follows: the terminal selects the received bitmap corresponding to the MCG or the SCG for the DRB based on the indication identifier, and the terminal determines the bit in the bitmap based on the indication bit.

Herein, the indication identifier represents a selection rule for determining to select one of the two bitmaps. That is, the indication identifier is used to instruct the terminal to select the bitmap corresponding to the MCG or the bitmap corresponding to the SCG. In a practical application, the indication identifier may be an identifier 0/1, and 0 and 1 correspond to the MCG and the SCG respectively. For example, in a case that the indication identifier is configured to be the identifier 0, the bitmap corresponding to the MCG is selected. In a case that the indication identifier is configured to be 1, the bitmap corresponding to the SCG is selected. In practical, the opposite is also true, the identifier 0 corresponds to the MCG and the identifier 1 corresponds to the SCG, which is not limited in the embodiment.

The indication bit may indicate any bit in the bitmap. In a case that the bitmap includes 8 bits, the indication bit may include 3 bits. For example, 000 corresponds to a first bit in the bitmap, 001 corresponds to a second bit in the bitmap, and so forth. The terminal may determine the bit in the bitmap based on the indication bit and determine to activate/deactivate the duplicated data transmission function of the DRB based on the value of the bit.

As a second implementation, the indication information includes the indication identifier, and the operation that the terminal determines the bit in the received bitmap based on the indication information configured correspondingly to the DRB and the preset rule includes an operation as follows: the terminal determines the received bitmap corresponding to the MCG or the SCG for the DRB based on the indication identifier; and the terminal determines the bit in the bitmap based on an identifier of the DRB.

Referring to description about the indication identifier in the first implementation, the indication identifier represents the determination rule for determining one of the two bitmaps. That is, the indication identifier is configured to instruct the terminal to determine the bitmap corresponding to the MCG or the bitmap corresponding to the SCG.

As an implementation, the operation that the terminal determines the bit in the bitmap based on the identifier of the DRB includes an operation as follows: the terminal performs sequencing on the identifier of the DRB and one or more identifiers of other DRBs and determines the bit in the bitmap based on a position of the identifier of the DRB in the sequencing. The sequencing includes sequencing in ascending order or sequencing in descending order.

Herein, the identifier of the DRB is denoted as a DRB ID, and DRB IDs of all DRBs are fixed and different from each other. The terminal performs sequencing on all DRB IDs, and a sequencing rule may be sequencing in ascending order or sequencing in descending order. For example, if the DRB ID is 3 and the IDs of the other DRBs include 1, 5, 7 and 9, the DRB ID is sequenced second in the sequencing of all the DRB IDs in ascending order, and a second bit in the bitmap is determined correspondingly. The DRB ID is sequenced third in the sequencing of all the DRB IDs in descending order, and a third bit in the bitmap is determined correspondingly.

As another implementation, the terminal may also determine the bit in the bitmap based on the ID of the DRB. The implementation is applied to a scenario where the number of bits in the bitmap is greater than or equal to the number of DRBs of the terminal and the DRB ID is not greater than 8. For example, if the DRB ID is 3, the third bit in the bitmap may be determined.

In the second application scenario, as a first implementation, the indication information includes the indication bit, and the operation that the terminal determines the bit in the received bitmap based on the indication information configured correspondingly to the DRB includes an operation as follows: the terminal selects the received bitmap corresponding to the MCG or the SCG for the DRB; and the terminal determines the bit in the bitmap based on the indication bit.

In the application scenario, the terminal may directly select the received bitmap corresponding to the MCG or the SCG for the DRB without the indication identifier. Furthermore, the indication bit may indicate any bit in the bitmap. In a case that the bitmap includes 8 bits, the indication bit may include 3 bits. For example, 000 corresponds to a first bit in the bitmap, 001 corresponds to a second bit in the bitmap, and so forth. The terminal determines the bit in the bitmap based on the indication bit and determines to activate/deactivate the duplicated data transmission function of the DRB based on the value of the bit.

As a second implementation, the operation that the terminal determines the bit in the received bitmap based on the preset rule includes an operation as follows: the terminal determines the received bitmap corresponding to the MCG or the SCG for the DRB; and the terminal determines the bit in the bitmap based on the identifier of the DRB.

In the application scenario, the terminal may directly determine the received bitmap corresponding to the MCG or the SCG for the DRB without the indication identifier.

In the embodiment, the operation that the terminal determines the bit in the bitmap based on the identifier of the DRB includes an operation as follows: the terminal performs sequencing on the identifier of the DRB and the one or more identifiers of other DRBs, and determines the bit in the bitmap based on the position of the identifier of the DRB in the sequencing. The sequencing includes sequencing in ascending order or sequencing in descending order.

Herein, the identifier of the DRB is denoted as a DRB ID, and the DRB IDs of all DRBs are fixed and different from each other. The terminal performs sequencing on all the DRB IDs, and the sequencing rule may be sequencing in ascending order or sequencing in descending order. For example, if the DRB ID is 3 and the IDs of the other DRBs include 1, 5, 7 and 9, the DRB ID is sequenced second in the sequencing of all the DRB IDs in ascending order, and, the second bit in the bitmap is determined correspondingly. The DRB ID is sequenced third in the sequencing of all the DRB IDs in descending order, and the third bit in the bitmap is determined correspondingly.

As another implementation, the terminal may also determine the bit in the bitmap based on the ID of the DRB. The implementation is applied to the scenario where the number of the bits in the bitmap is greater than or equal to the number of the DRBs of the terminal and the DRB ID is not greater than 8. For example, if the DRB ID is 3, the third bit in the bitmap may be determined.

In the application scenario, indication information configured correspondingly to non-split DRBs of different cell groups may have identical or different indication bits. For example, all of the indication information corresponding to the non-split bearers belonging to different CGs may be configured with the indication bits of 000.

In the embodiment, the indication identifier is only configured in the indication information corresponding to the split DRB having the duplicated data transmission function, to indicate that the split DRB is controlled by the MCG MAC CE or controlled by the SCG MAC CE. No indication identifier is configured in indication information corresponding to a non-split DRB.

In the embodiment, irrespective of a non-split bearer of the MCG or a non-split bearer of the SCG, the duplicated data transmission function is only controlled by the received MAC CE corresponding to the MAC entity of the MCG or the received MAC CE corresponding to the MAC entity of the SCG.

With the technical solutions according to the embodiments of the disclosure, the bit in the bitmap is determined based on the indication information configured correspondingly to the DRB and/or the preset rule, and the bitmap corresponding to the MCG or the SCG may be determined based on the indication information in a dual connection scenario. Therefore, the duplicated data transmission function of the DRB may be activated/deactivated based on the indication about the bit in the bitmap.

The method for controlling the duplicated data transmission function according to the embodiment of the disclosure is described in detail below in combination with an application scenario.

First Scenario

In the scenario, the terminal determines an indication identifier and an indication bit corresponding to the DRB based on signaling of the network device, and determines to select the received MCG MAC CE corresponding to the MCG for the DRB based on the indication identifier.

The terminal receives, from the MAC entity of the MCG, the MAC CE used to control activation/de-activation of the duplicated data transmission function.

Figure 3:
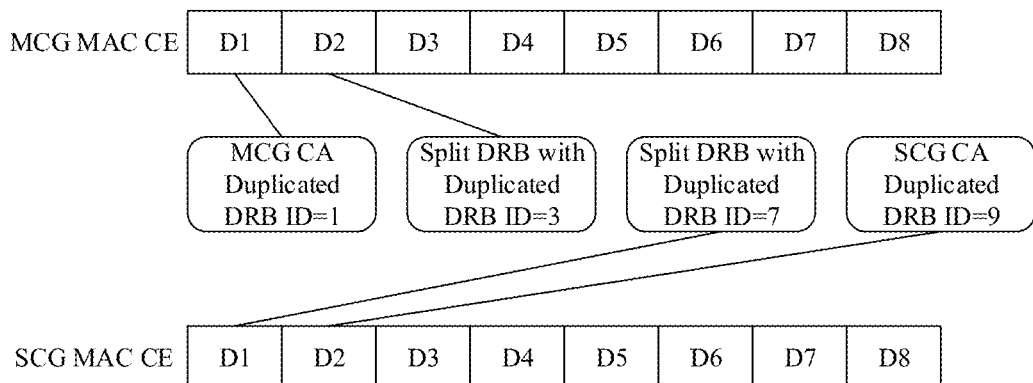
FIG. 3 is a schematic diagram showing an application of a method for controlling duplicated data transmission function according to an embodiment of the disclosure.

The terminal determines a DRB controlled by the MAC entity of the MCG. For example, as shown in FIG. 3, the terminal may determine that a non-split DRB with a DRB ID=1 is controlled by the MCG MAC CE, and may also determine that the split DRB with a DRB ID=3 is controlled by the MCG MAC CE by checking the indication identifier 0/1 configured in the split DRB.

The terminal checks indication bits in the two DRBs, and determines that the non-split DRB with the DRB ID=1 is controlled by a first bit in the bitmap and the DRB with the DRB ID=3 is controlled by a second bit in the bitmap. All of the remaining bits in the bitmap are invalid bits.

The MAC entity of the terminal instructs a PDCP entity of the non-split DRB with DRB ID=1 of a bit value of the first bit in the bitmap, the MAC entity of the terminal instructs a PDCP entity of the split DRB with DRB ID=3 of a bit value of the second bit in the bitmap. The PDCP entities determine to activate/deactivate the duplicated data transmission function of the DRBs corresponding to the instructed bit values based on the instructed bit values.

Second Scenario

In the scenario, the terminal determines an indication identifier corresponding to the DRB based on signaling of the network device and determines the received MCG MAC CE corresponding to the MCG for the split DRB based on the indication identifier.

The terminal receives, from the MAC entity of the MCG, the MAC CE used to control activation/de-activation of the duplicated data transmission function. The terminal determines a DRB controlled by the MAC entity of the MCG.

For example, as shown in FIG. 3, the terminal may determine that the non-split DRB with the DRB ID=1 is controlled by the MCG MAC CE, and may also determine that the split DRB with the DRB ID=3 is controlled by the MCG MAC CE by checking indication identifier 0/1 configured in the split DRB.

The terminal determines correspondences based on DRB IDs. For example, the correspondences may be determined through sequencing in ascending order (or sequencing in descending order) of the DRB IDs. For example, the DRB IDs in the terminal include 1, 3, 5 and 6. The DRB ID 1 is sequenced first in the sequencing in ascending order, and thus the non-split DRB with the DRB ID=1 corresponds to the first bit in the bitmap. The DRB ID=3 is sequenced second in the sequencing in ascending order, and thus the split DRB with the DRB ID=3 corresponds to the second bit in the bitmap. All of the remaining bits in the bitmap are invalid.

The MAC entity of the terminal instructs a PDCP entity of the non-split DRB with the DRB ID=1 of a bit value of the first bit in the bitmap, the MAC entity of the terminal instructs the PDCP entity of the split DRB with the DRB ID=3 of the bit value of the second bit in the bitmap. The PDCP entities determine to activate/deactivate the duplicated data transmission function of the DRBs corresponding to the instructed bit values based on the instructed bit values.

Second Embodiment

Figure 4:
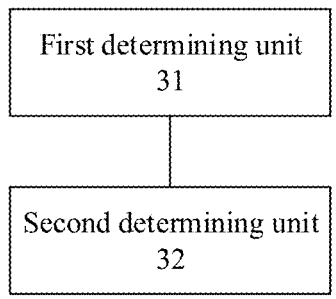
FIG. 4 is a schematic diagram showing a composition structure of a terminal according to an embodiment of the disclosure.

A terminal is further provided according to an embodiment of the disclosure. FIG. 4 is a schematic diagram showing a composition structure of a terminal according to an embodiment of the disclosure. As shown in FIG. 4, the terminal includes a first determining unit 31 and a second determining unit 32.

The first determining unit 31 is configured to determine a bit in a received bitmap based on indication information configured correspondingly to a DRB and/or a preset rule. The bitmap is of two received bitmaps.

The second determining unit 32 is configured to determine to activate/deactivate duplicated data transmission function of the DRB based on the bit determined by the first determining unit 31.

In a first application scenario, the DRB is a split DRB which is configured with the duplicated data transmission function.

As a first implementation, the indication information includes an indication identifier and an indication bit.

The first determining unit 31 is configured to select a received bitmap corresponding to an MCG or an SCG for the DRB based on the indication identifier and determine a bit in the bitmap based on the indication bit.

As a second implementation, the indication information includes an indication identifier.

The first determining unit 31 is configured to determine a received bitmap corresponding to the MCG or the SCG for the DRB based on the indication identifier and determine a bit in the bitmap based on an identifier of the DRB.

In a second application scenario, the DRB is a non-split DRB which is configured with the duplicated data transmission function.

As a first implementation, the indication information includes the indication bit.

The first determining unit 31 is configured to select a received bitmap corresponding to the MCG or the SCG for the DRB and determine a bit in the bitmap based on the indication bit.

As a second implementation, the first determining unit 31 is configured to determine a received bitmap corresponding to the MCG or the SCG for the DRB and determine a bit in the bitmap based on an identifier of the DRB.

Herein, pieces of indication information configured correspondingly to non-split DRBs of different cell groups have identical or different indication bits.

In the embodiment, the first determining unit 31 is configured to perform sequencing on the ID of the DRB and one or more IDs of other DRBs, and determine a bit in the bitmap based on a position of the ID of the DRB in the sequencing. The sequencing includes sequencing in ascending order or sequencing in descending order.

Figure 5:
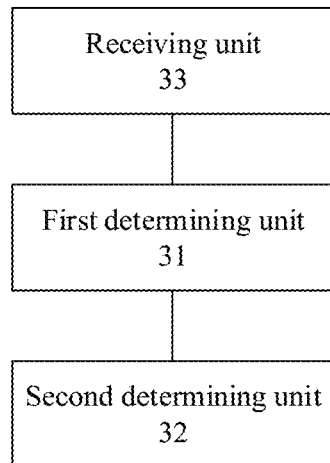
FIG. 5 is a schematic diagram showing a composition structure of a terminal according to an embodiment of the disclosure.

As an implementation, FIG. 5 is a schematic diagram showing another composition structure of a terminal according to an embodiment of the disclosure. As shown in FIG. 5, the terminal further includes a receiving unit 33. The receiving unit is configured to, before the first determining unit 31 determines the bit in the received bitmap based on the indication information configured correspondingly to the DRB and/or the preset rule, receive a bitmap corresponding to a MAC entity of the MCG and a bitmap corresponding to a MAC entity of the SCG.

Herein, the receiving unit 33 includes a first receiving subunit and a second receiving subunit.

The first receiving subunit is configured to receive, through a first MAC entity, a first MAC CE corresponding to the MAC entity of the MCG, and obtain a bitmap in the first MAC CE.

The second receiving subunit is configured to receive, through a second MAC entity, a second MAC CE corresponding to the MAC entity of the SCG, and obtain a bitmap in the second MAC CE.

Herein, the second determining unit 32 is configured to determine, through a PDCP entity, to activate/deactivate the duplicated data transmission function of the DRB based on a value of the bit. The PDCP entity corresponds to the DRB.

In the embodiment of the disclosure, both of the first determining unit 31 and second determining unit 32 in the terminal may be implemented by a Central Processing Unit (CPU), a Digital Signal Processor (DSP), a Microcontroller Unit (MCU) or a Field-Programmable Gate Array (FPGA) in a practical application. The receiving unit 33 (including the first receiving subunit and the second receiving subunit) in the terminal may be implemented by a communication module (including an infrastructure communication suite, an operating system, a communication module, a standard interface, a protocol and the like) and a transceiver antenna in a practical application.

It should be noted that the terminal provided in the embodiment is exemplified with division of the abovementioned program modules in controlling the duplicated data transmission function. In the practical application, such processing may be assigned to different program modules for implementation as required, that is, an internal structure of the terminal is divided into different program modules to implement all or part of abovementioned processing. In addition, the terminal provided in the above embodiment belongs to the same concept as the method embodiment, and reference may be made onto the method embodiment for a specific implementation process of the terminal, which is not be described repeatedly here anymore.

Fourth Embodiment

Figure 6:
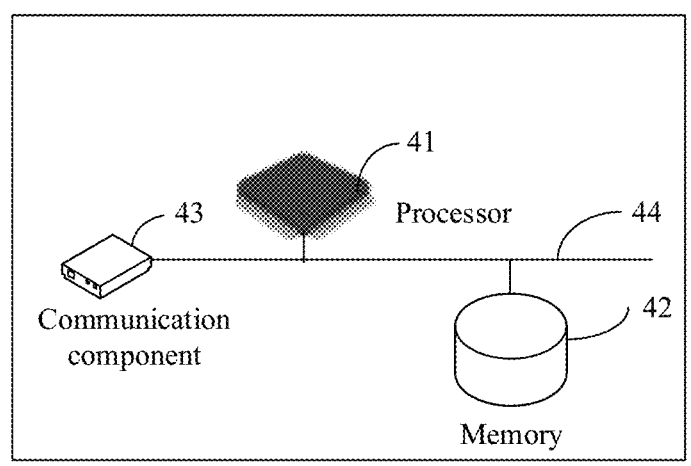
FIG. 6 is a schematic diagram showing a hardware composition structure of a terminal according to an embodiment of the disclosure.

A terminal is further provided according to an embodiment of the disclosure. FIG. 6 is a schematic diagram showing a hardware composition structure of a terminal according to an embodiment of the disclosure. As shown in FIG. 6, the terminal includes a communication component 43 configured for data transmission, at least one processor 41 and a memory 42 configured to store a computer program capable of being run in the processor 41. All components in the terminal are coupled together through a bus system 44. It can be understood that the bus system 44 is configured to implement connection communication between these components. The bus system 44 includes a power bus, a control bus and a state signal bus, in addition to a data bus. For clear description, however, various buses in FIG. 6 are represented as the bus system 44.

It can be understood that the memory 42 may be a volatile memory or a nonvolatile memory, and may also include both of the volatile memory and nonvolatile memory. Herein, the nonvolatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc or a compact disc read-only memory (CD-ROM). The magnetic surface memory may be a magnetic disk memory or a magnetic tape memory. The volatile memory may be a random access memory (RAM), and is used as an external high-speed cache. It is exemplarily but unlimitedly described that an RAM in various forms may be used, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a syncLink dynamic random access memory (SLDRAM) and a direct rambus random access memory (DRRAM). The memory 42 described in the embodiment of the disclosure includes, but is not limited to, these and any other proper types of memories.

The method disclosed in the embodiment of the disclosure may be applied to the processor 41 or may be implemented by the processor 41. The processor 41 may be an integrated circuit chip with a signal processing capability. In an implementation process, all steps of the method described above may be implemented by an integrated logic circuit of hardware in the processor 41 or an instruction in a software form. The processor 41 described above may be a universal processor, a DSP or another programmable logic device, a discrete gate or a transistor logic device, a discrete hardware component and the like. The processor 41 may implement or execute the methods, the steps and the logical block diagrams disclosed in the embodiments of the disclosure. The universal processor may be a microprocessor, any conventional processor or the like. The steps of the method disclosed in combination with the embodiments of the disclosure may be directly embodied to be executed by a hardware decoding processor or by a combination of hardware and software modules in the decoding processor. The software module may be provided in a storage medium, and the storage medium is provided in the memory 42. The processor 41 reads information in the memory 42 and implements the steps of the method in combination with hardware thereof.

In an exemplary embodiment, the terminal may be implemented by one or more application specific integrated circuits (ASICs), a DSP, a programmable logic device (PLD), a complex programmable logic device (CPLD), an FPGA, a universal processor, a controller, an MCU, a microprocessor or other electronic components, for executing the abovementioned method.

In the embodiment, the processor 41, when executing the program, implements the following operations: determining a bit in a received bitmap based on indication information configured correspondingly to a DRB and/or a preset rule, the bitmap being of two received bitmaps; and determining to activate/deactivate duplicated data transmission function of the DRB based on the bit.

In a first application scenario, the DRB is a split DRB which is configured with the duplicated data transmission function.

As an implementation, the indication information includes an indication identifier and an indication bit, and the processor 41, when executing the program, implements the following operations: selecting a received bitmap corresponding to an MCG or an SCG for the DRB based on the indication identifier; and determining a bit in the bitmap based on the indication bit.

As another implementation, the indication information includes the indication identifier, and the processor 41, when executing the program, implements the following operations: determining a received bitmap corresponding to the MCG or the SCG for the DRB based on the indication identifier; and determining a bit in the bitmap based on an identifier of the DRB.

In a second application scenario, the DRB is a non-split DRB which is configured with the duplicated data transmission function.

As an implementation, the indication information includes an indication bit, and the processor 41, when executing the program, implements the following operations: selecting a received bitmap corresponding to the MCG or the SCG for the DRB; and determining a bit in the bitmap based on the indication bit.

As another implementation, the processor 41, when executing the program, implements the following operations: determining a received bitmap corresponding to the MCG or the SCG for the DRB; and determining a bit in the bitmap based on the identifier of the DRB.

Herein, pieces of indication information configured correspondingly to non-split DRBs of different cell groups have identical or different indication bits.

In the embodiment, the processor 41, when executing the program, implements the following operations: performing sequencing on the ID of the DRB and one or more IDs of other DRBs and determining a bit in the bitmap based on a position of the ID of the DRB in the sequencing. The sequencing includes sequencing in ascending order or sequencing in descending order.

As an implementation, the processor 41, when executing the program, implements the following operation: before determining the bit in the received bitmap based on the indication information configured correspondingly to the DRB and/or the preset rule, receiving a bitmap corresponding to a MAC entity of the MCG and a bitmap corresponding to a MAC entity of the SCG.

Herein, the processor 41, when executing the program, implements the following operations: a first MAC entity receives a first MAC CE corresponding to the MAC entity of the MCG and obtains a bitmap in the first MAC CE; and a second MAC entity receives a second MAC CE corresponding to the MAC entity of the SCG and obtains a bitmap in the second MAC CE.

Herein, the processor 41, when executing the program, implements the following operations: a PDCP entity determines to activate/deactivate the duplicated data transmission function of the DRB based on a value of the bit. The PDCP entity corresponds to the DRB.

Fourth Embodiment

A computer storage medium is further provided according to an embodiment of the disclosure, which includes, for example, a memory 42 as shown in FIG. 6 on which a computer program is stored. The computer program may be executed by a processor 41 of a device to implement the steps of the above method. The computer storage medium may be a memory such as an FRAM, a ROM, a PROM, an EPROM, an EEPROM, a flash memory, a magnetic surface memory, a compact disc or a CD-ROM, and may also any device including one or any combination of the above memories.

In the embodiment, the computer program is stored in the computer storage medium provided in the embodiment of the disclosure. The computer program, when being run by the processor, executes the following operations: determining a bit in a received bitmap based on indication information configured correspondingly to a DRB and/or a preset rule, the bitmap being of two received bitmaps; and determining to activate/deactivate duplicated data transmission function of the DRB based on the bit.

In a first application scenario, the DRB is a split DRB which is configured with the duplicated data transmission function.

As an implementation, the indication information includes an indication identifier and an indication bit. The computer program, when being run by the processor, executes the following operations: selecting a received bitmap corresponding to an MCG or an SCG for the DRB based on the indication identifier; and determining a bit in the bitmap based on the indication bit.

As another implementation, the indication information includes an indication identifier. The computer program, when being run by the processor, executes the following operations: determining a received bitmap corresponding to the MCG or the SCG for the DRB based on the indication identifier; and determining a bit in the bitmap based on an identifier of the DRB.

In a second application scenario, the DRB is a non-split DRB which is configured with the duplicated data transmission function.

As an implementation, the indication information includes an indication bit. The computer program, when being run by the processor, execute the following operations: selecting a received bitmap corresponding to the MCG or the SCG for the DRB; and determining a bit in the bitmap based on the indication bit.

As another implementation, the computer program, when being run by the processor, executes the following operations: determining a received bitmap corresponding to the MCG or the SCG for the DRB; and determining a bit in the bitmap based on the identifier of the DRB.

Herein, pieces of indication information configured correspondingly to the non-split DRBs of different cell groups has identical or different indication bits.

In the embodiment, the computer program, when being run by the processor, executes the following operations: performing sequencing on the identifier of the DRB and one or more identifiers of other DRBs and determining a bit in the bitmap based on a position of the identifier of the DRB in the sequencing. The sequencing includes sequencing in ascending order or sequencing in descending order.

As an implementation, the computer program, when being run by the processor, executes the following operation: before determining the bit in the received bitmap based on the indication information configured correspondingly to the DRB and/or the preset rule, receiving a bitmap corresponding to a MAC entity of the MCG and a bitmap corresponding to a MAC entity of the SCG.

Herein, the computer program, when being run by the processor, executes the following operations: a first MAC entity receives a first MAC CE corresponding to the MAC entity of the MCG and obtains a bitmap in the first MAC CE; and a second MAC entity receives a second MAC CE corresponding to the MAC entity of the SCG and obtains a bitmap in the second MAC CE.

Herein, the computer program, when being run by the processor, executes the following operations: a PDCP entity determines to activate/deactivate the duplicated data transmission function of the DRB based on a value of the bit. The PDCP entity corresponds to the DRB.

In some embodiments provided by the application, it should be understood that the disclosed terminal and method may be implemented in another manner. The device embodiment described above is merely schematic. For example, the units are divided according to a logic function, and the units may be divided in other manners in practical implementation. For example, multiple units or components may be combined or integrated into another system, or some characteristics may be neglected or not executed. In addition, coupling or direct coupling or a communication connection between all components displayed or discussed may be indirect coupling or communication connection through some interfaces, device or unit, and may be electrical and mechanical or in other forms.

The units described as separate parts may be or may not be physically separated, and parts displayed as units may be or may not be physical units. That is, the units may be provided in the same place, or may also be distributed to multiple network units. A part or all of the units may be selected according to a practical requirement to achieve the purposes of the solutions of the embodiments.

In addition, all functional units in each embodiment of the disclosure may be integrated into a processing unit. Alternatively, each unit may also serve as an independent unit, or two or more than two units may also be integrated into a unit. The integrated unit may be implemented in a hardware form and may also be implemented in a form of hardware and software functional unit.

Those skilled in the art should understand that all or a part of the steps for implementing the method embodiment may be implemented by instructing related hardware through a program. The above program may be stored in a computer-readable storage medium. The program, when being executed, implements the steps of the method embodiment above. The above storage medium includes a mobile storage device, an ROM, an RAM, a magnetic disk a compact disc or various mediums capable of storing program codes.

Alternatively, when being implemented in form of software functional module and sold or used as an independent product, the above integrated unit according to the disclosure may also be stored in a computer-readable storage medium. Based on such an understanding, an essential part of the technical solution according to the embodiments of the disclosure or a part of the technical solution making contributions to the conventional art may be embodied in form of software product. The computer software product is stored in a storage medium, including several instructions which enables a computer device (which may be a personal computer, a server, a network device or the like) to execute all or a part of the method in each of the embodiments of the disclosure. The above storage medium includes a mobile storage device, an ROM, an RAM, a magnetic disk, or a compact disc or various media capable of storing program codes.

The forgoing is only the embodiments of the disclosure, however the protection scope of the disclosure is not limited thereto. Any variations or substitution apparent to those skilled in the art within the technical scope disclosed by the disclosure shall fall within the protection scope of the disclosure. Therefore, the protection scope of the disclosure shall conform to the protection scope of the claims.

The invention claimed is:

1. A method for controlling duplicated data transmission function, comprising:
   determining, by a terminal, a bit in a received bitmap based on indication information configured correspondingly to a data radio bearer (DRB) and a preset rule,
      wherein the indication information comprises an identifier of the DRB,
      wherein the received bitmap is selected, based on the indication information, from two bitmaps corresponding to a master cell group (MCG) and a secondary cell group (SCG) for the DRB, and
      wherein the bit in the received bitmap is determined based on the identifier of the DRB and the order of the identifier of the DRB in the sorting of identifiers of other DRBs;
   determining, by the terminal, to activate/deactivate duplicated data transmission function of the DRB based on the bit.

2. The method of claim 1, wherein the DRB is a split DRB which is configured with the duplicated data transmission function.

3. The method of claim 2, wherein the indication information comprises an indication identifier and an indication bit, and
   the determining, by the terminal, the bit in the received bitmap based on the indication information configured correspondingly to the DRB comprises:
   selecting, by the terminal, the received bitmap corresponding to the MCG or the SCG for the DRB based on the indication identifier; and
   determining, by the terminal, the bit in the received bitmap based on the indication bit.

4. The method of claim 1, wherein the DRB is a non-split DRB which is configured with the duplicated data transmission function.

5. The method of claim 4, wherein the indication information comprises an indication bit, and
   the determining, by the terminal, the bit in the received bitmap based on the indication information configured correspondingly to the DRB comprises:
   determining, by the terminal, the bit in the received bitmap based on the indication bit.

6. The method of claim 5, wherein pieces of indication information configured correspondingly to non-split DRBs of different cell groups have identical or different indication bits.

7. The method of claim 1, wherein the determining, by the terminal, the bit in the received bitmap based on the identifier of the DRB comprises:
   sequencing, by the terminal, the identifier of the DRB and one or more identifiers of other DRBs, and
   determining, by the terminal, the bit in the received bitmap based on a position of the identifier of the DRB in the sequencing,
   wherein the sequencing comprises sequencing in ascending order or sequencing in descending order.

8. The method of claim 1, before the determining, by the terminal, the bit in the received bitmap based on the indication information configured correspondingly to the DRB and the preset rule, further comprising:

receiving, by the terminal, a bitmap corresponding to a media access control (MAC) entity of the MCG and a bitmap corresponding to MAC entity of the SCG.

9. The method of claim 8, wherein the receiving, by the terminal, the bitmap corresponding to the MAC entity of the MCG and the bitmap corresponding to the MAC entity of the SCG comprises:

receiving, by a first MAC entity of the terminal, a first MAC control element (CE) corresponding to the MAC entity of the MCG, and obtaining, by the first MAC entity of the terminal, the received bitmap in the first MAC CE; and receiving, by a second MAC entity of the terminal, a second MAC CE corresponding to the MAC entity of the SCG, and obtaining, by the second MAC entity of the terminal, the received bitmap in the second MAC CE.

10. The method of claim 9, wherein the determining, by the terminal, to activate/deactivate the duplicated data transmission function of the DRB based on the bit comprises:

determining, by a packet data convergence protocol (PDCP) entity of the terminal, to activate/deactivate the duplicated data transmission function of the DRB based on a value of the bit, wherein the PDCP entity corresponds to the DRB.

11. A terminal, comprising a communication component configured for data transmission, a memory, a processor, and a computer program stored in the memory and capable of being run in the processor, wherein the processor is configured to run the program to execute operations of:

determining a bit in a received bitmap based indication information configured correspondingly to a data radio bearer (DRB) and a preset rule, wherein the indication information comprises an identifier of the DRB, wherein the received bitmap is selected, based on the indication information, from two bitmaps corresponding to a master cell group (MCG) and a secondary cell group (SCG) for the DRB, and wherein the bit in the received bitmap is determined based on the identifier of the DRB and the order of the identifier of the DRB in the sorting of identifiers of other DRBs; and determining to activate/deactivate duplicated data transmission function of the DRB based on the bit.

12. The terminal of claim 11, wherein the DRB is a split DRB which is configured with the duplicated data transmission function.

13. The terminal of claim 12, wherein the indication information comprises an indication bit, and the processor is further configured to run the program to execute operations of:

determining the bit in the received bitmap based on the indication bit.

14. The terminal of claim 11, wherein the DRB is a non-split DRB which is configured with the duplicated data transmission function.

15. The terminal of claim 14, wherein the indication information comprises an indication bit, and the processor is further configured to run the program to execute operations of:

determining the bit in the received bitmap based on the indication bit.

16. The terminal of claim 15, wherein pieces of indication information configured correspondingly to non-split DRBs of different cell groups have identical or different indication bits.

17. The terminal of claim 11, wherein the processor is further configured to run the program to execute operations of:

sequencing the identifier of the DRB and one or more identifiers of other DRBs; and determining the bit in the received bitmap based on a position of the identifier of the DRB in the sequencing, wherein the sequencing comprises sequencing in ascending order or sequencing in descending order.

18. The terminal of claim 11, wherein the processor is further configured to run the program to execute an operation of:

before determining the bit in the received bitmap based on the indication information configured correspondingly to the DRB and the preset rule, controlling the communication component to receive a bitmap corresponding to a media access control (MAC) entity of the MCG and a bitmap corresponding to an MAC entity of the SCG.

19. The terminal of claim 18, wherein the processor is further configured to run the program to execute operations of:

controlling the communication component to receive, through a first MAC entity, a first MAC control element (CE) corresponding to the MAC entity of the MCG, and obtaining, by the first MAC entity, the received bitmap in the first MAC CE; and controlling the communication component to receive, through a second MAC entity, a second MAC CE corresponding to the MAC entity of the SCG, and obtaining, by the second MAC entity, the received bitmap in the second MAC CE.

20. The terminal of claim 19, wherein the processor is further configured to run the program to execute an operation of: determining, through a packet data convergence protocol (PDCP) entity, to activate/deactivate the duplicated data transmission function of the DRB based on a value of the bit, wherein the PDCP entity corresponds to the DRB.

* * * * *